(No Model.)  3 Sheets—Sheet 1.

J. JOHNSON.
PEANUT CLEANER AND GRADER.

No. 315,793. Patented Apr. 14, 1885.

WITNESSES
Phil C. Dietrich
T. R. Keyworth

INVENTOR
Joser Johnson
by
Chas. Alexander
Attorney (No Model.) 3 Sheets—Sheet 2.
J. JOHNSON.
PEANUT CLEANER AND GRADER.
No. 315,793. Patented Apr. 14, 1885.
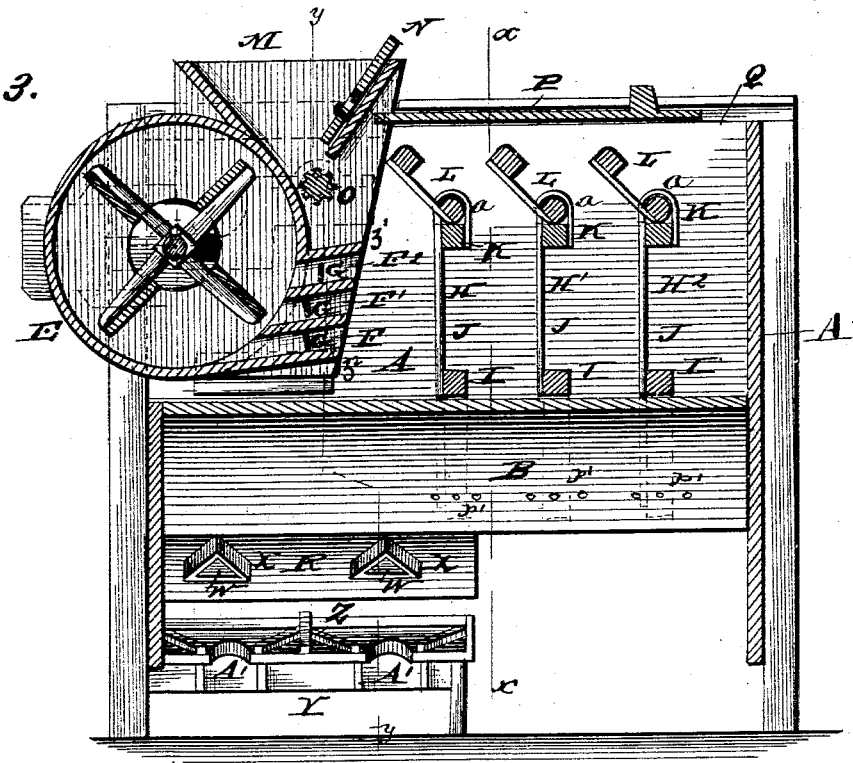

(No Model.) 3 Sheets—Sheet 3.
J. JOHNSON.
PEANUT CLEANER AND GRADER.
No. 315,793. Patented Apr. 14, 1885.
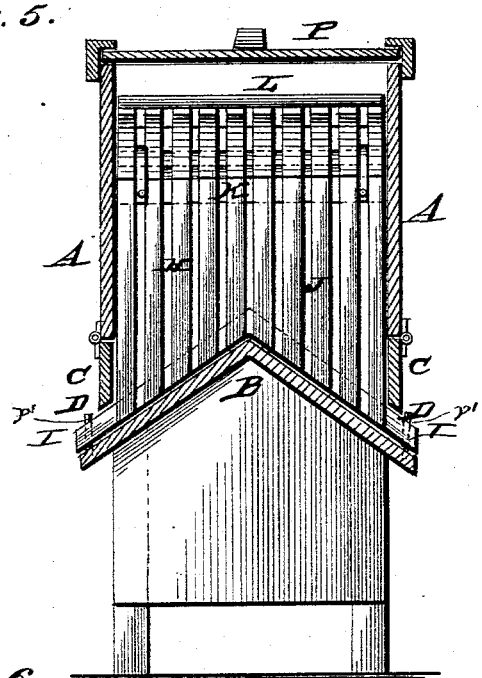
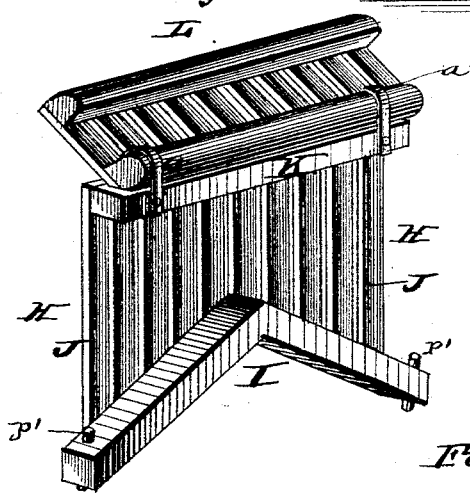
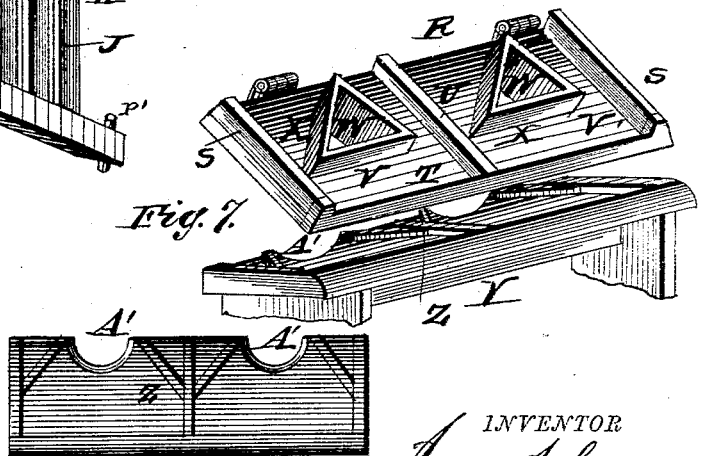
WITNESSES
INVENTOR

UNITED STATES PATENT OFFICE.

JOSEE JOHNSON, OF NORFOLK, VIRGINIA.

PEANUT CLEANER AND GRADER.

SPECIFICATION forming part of Letters Patent No. 315,793, dated April 14, 1885.

Application filed April 15, 1884. (No model.)

*To all whom it may concern:*

Be it known that I, JOSEE JOHNSON, of Norfolk, in the county of Norfolk and State of Virginia, have invented certain new and useful Improvements in Peanut Cleaners and Graders; and I do hereby declare that the following is a full, clear, and exact description thereof, reference being had to the accompanying drawings, and to the letters of reference marked thereon, which form part of this specification.

This invention relates to machines for cleaning and separating peanuts; and it has for its objects to provide a device having superior facilities for grading and separating those nuts which have been already screened and freed from the dust and dirt, as well as from the lightest and lowest grades of nuts.

To this end it consists in the improved construction and arrangement of parts, which will be hereinafter fully described, and particularly pointed out in the claims.

Figure 1:
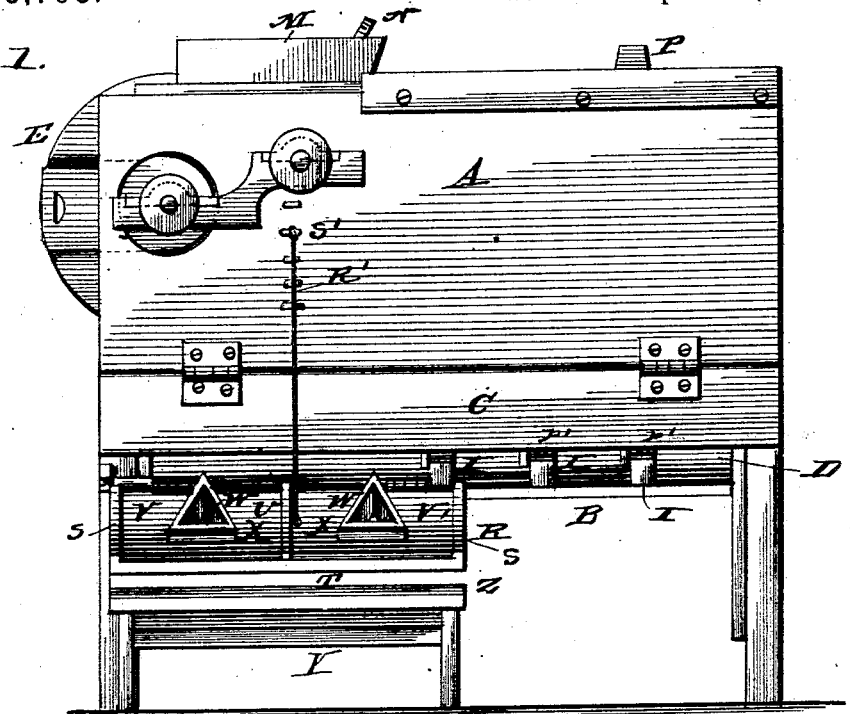
Figure 2:
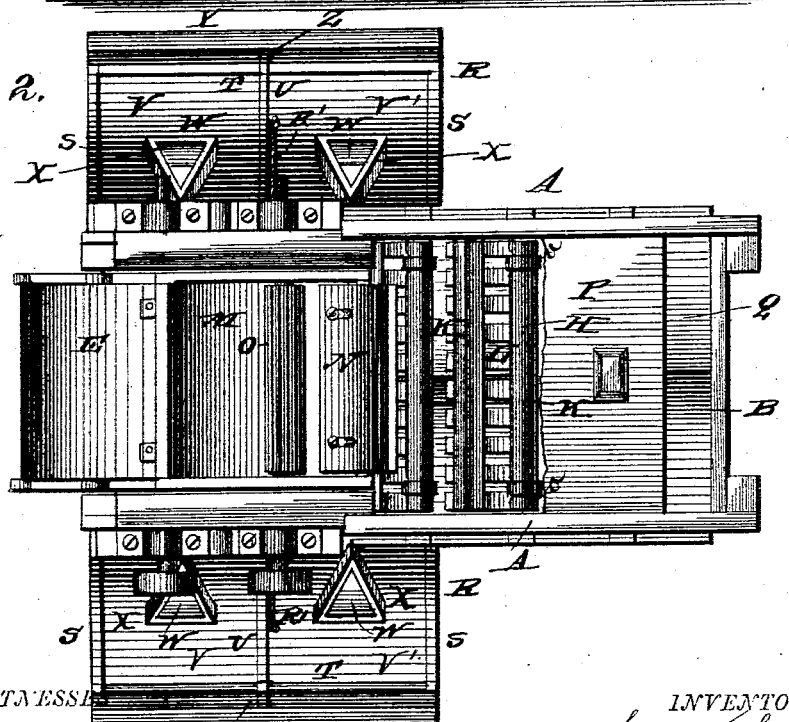

In the drawings hereto annexed, Figure 1 is a side view of my improved machine. Fig. 2 is a top view of the same. Fig. 3 is a longitudinal vertical sectional view taken centrally through the machine. Fig. 4 is a transverse vertical sectional view taken through the hopper in the plane indicated by dotted line $y\ y$ on Fig. 3. Fig. 5 is a transverse vertical sectional view taken on the line $x\ x$, Fig. 3. Fig. 6 is a detail view of one of the separating-partitions, and Fig. 7 is a detail view of the picking-table.

The same letters refer to the same parts in all the figures.

In the drawings hereto annexed, A designates the casing of the machine, which consists, mainly, of a rectangular box, the bottom B of which is of an inverted-V shape, so as to shed the nuts as they are being cleaned to each side of the machine. Each side of the casing has a door, C, which does not extend entirely to the bottom, but leaves a narrow longitudinal opening, D.

E designates a fan-case, which is located at the front of the machine and provided with end induction-openings and a suitable fan. The fan-case is constructed with a series of blast-passages, F F' F$^2$, or chutes, which are directed upwardly, as shown in Fig. 3, and their discharge ends terminate in a plane, $z'$ $z^2$, which is inclined backward for the purpose of preventing anything falling past the highest chute, F$^2$, from entering any of the lower chutes and clogging the same or entering the fan-case.

It is obvious that peanuts falling from the hopper will pass the several chutes unobstructedly and be successively subjected to blasts of air from the fan-case.

The operation or effect of this part of my invention is this: The air-blasts are graduated and regulated by the valves or wind-boards G, the shafts of which extend through on both sides of the casing, so that the boards can be adjusted in any desired manner. The blast from the highest chute, F$^2$, is such as to drive all or most all of the trash and lighter peanuts over all of the partitions H H' H$^2$ and out at the passage Q. The next lower blast from the chute F' strikes the peanuts and aids the separation of foreign matters from them, and the lower blast completes the cleaning process. The peanuts are thus subjected to three independent blasts while falling from the hopper to the double-inclined bottom B of the several compartments formed by the partitions H H' H$^2$, hereinafter explained. If these partitions are slatted, as shown in the drawings, currents of air will pass off freely through them, thereby preventing the air from banking up in the first compartment.

H H' H$^2$ are a series of transverse screens or partitions, (of which there may be any suitable number,) each of which consists of a saddle, I, straddling the bottom of the casing, and having a series of upwardly-extending slats, J, connected by a cap, K, to which is hinged a top gate, L, comprising a pair of transverse parallel horizontal bars connected by suitably-spaced slats. The gates L, being hinged by straps $a$, may be set or adjusted to any desired position in relation to the main frames H, for purposes which will be hereinafter stated. The screens or partitions H H' H$^2$ may be moved or adjusted longitudinally in the box or casing, and any suitable means may be employed for retaining them in any position to which they may be adjusted.

I would have it understood that although the hinged top gates, L, are desirable, and while they sometimes perform an important function, their presence may be dispensed with without departing from the spirit of my invention. Above and in rear of the fan-case is arranged the feed-hopper M, one side of which is provided with an adjustable valve-board, N, for regulating the feed.

O is a grooved or corrugated feed-roller arranged transversely in the hopper, at or near the bottom of the same, and operated in any suitable manner—for instance, by a belt or band running from the fan-shaft, which may be driven by hand or other power.

The casing A is provided with a sliding top or cover, P, which terminates, when closed, some distance from the rear end, so as to leave an opening, Q, for the escape of the blast and such dust as may not have been previously removed. The sides of the inclined bottom of the box or casing are provided with hinged tables R R, arranged, preferably, about half the length of the box; but which may extend for any desired length, each of which is provided with side flanges, S S, a beveled or rounded bottom edge, T, and one or more suitably-located partition-strips, U, subdividing the table into divisions V V', each of which has a triangular opening, W, pointing upward, and surrounded by flanges X, of sufficient height to prevent the nuts coming from the machine from gravitating into the openings W. The latter may be provided with chutes leading to some suitable receptacle. Under each of the tables R, when in operation, is placed a bench or receiving-table, Y, having an inclined surface provided with guide-flanges Z, that lead to the escape-openings A', which may be provided with hooks or other devices for holding bags or other receptacles into which the cleaned and assorted nuts are dumped.

For the purpose of adjusting the hinged picking-tables any suitable device may be employed—for instance, a hooked rod, R', that may be adjusted in any one of a series of staples, S', in the side of the casing. By this arrangement the picking-tables may be so adjusted as to cause the nuts to pass over them at any desired rate of speed that may suit the attendants.

The operation of this invention will be readily understood from the foregoing description, taken in connection with the drawings hereto annexed. The nuts as they pass from the hopper are dumped directly in rear of the blast-openings of the fan-case. The lightest of the nuts will be distributed between the several partitions and will drop upon the bottom of the same, whence they are deflected to either side and into bags or other receptacles, which for the purpose may be attached to or placed under the sides of the inclined bottom. Dust and chaff are blown out through the opening at the rear end of the top of the casing. The next lighter grades of nuts are arrested by the rear partitions, thrown to the bottom of the casing, and deflected into bags or receptacles. The heaviest and most superior grades of nuts are arrested by the first partition and deflected to the divisions V V' of the picking-tables, at which attendants are stationed, whose duty it is to separate the black and rotten nuts (the weight of which causes them to mingle with the best grade) from the superior product, which latter is allowed to pass over the edge of table R onto the inclined bench, and thence into the bags attached to the latter, while the refuse is thrown into the openings W and thence conveyed to any suitable place of deposit. The transverse partition-screens, being adjustable by means of screws or pins $p'$, may be so arranged as to grade or separate the nuts in any desired manner, and the hinged top gates of the said partitions may be placed at various inclinations, so as to assist in the gradation and render it more perfect. The partitions being slatted, as shown, enable the blast to pass entirely through the box or casing A. The blast, as is evident, may be regulated by the valves or deflectors in the openings of the fan box or case.

It is obvious that this machine may be employed when desired for grading and separating nuts that have not been previously cleaned and scoured, as well as those that have been subjected to this process.

I claim as my invention and desire to secure by Letters Patent of the United States—

1. The combination, with a feed-hopper, fan-case, and fan, of a series of blast-chutes provided with regulating-valves and having their discharge ends terminating in a plane inclining backward, as described, and arranged below said feed-hopper, substantially as specified.

2. In a peanut-cleaner, the combination of the box or casing, a fan, and a series of adjustable transverse partition-screens, and an angular floor in the casing, substantially as set forth.

3. The combination of the box or casing having an inverted-V-shaped bottom, the hinged doors terminating above the lower edges of said bottom, the fan-case having two or more upwardly-inclined spouts or blast-openings, and the adjustable partition-screens, substantially as set forth.

4. The combination, with the box having an inverted-V-shaped bottom, of an adjustable partition-screen comprising a saddle straddling the said bottom, a series of vertical slats, and a cap-piece, substantially as set forth.

5. In a peanut-cleaner, an adjustable partition-screen provided at its upper edge with a hinged and adjustable gate, substantially as and for the purpose set forth.

6. The combination of the box or casing having an inverted-V-shaped bottom and provided with side doors terminating above the edges of the said bottom, the fan, the case of which is provided with a series of blast-openings, as described, and the adjustable partition-screens provided with hinged top gates, substantially as set forth.

7. In a peanut-cleaner, the combination, with the box or casing having an inverted-V-shaped bottom, of the picking-tables hinged to the sides of the same and provided with flanges, beveled bottom edges, and triangular openings surrounded by flanges, substantially as and for the purpose set forth.

8. The combination, with the hinged picking-table, of the bench having an inclined top provided with guide-flanges and exit-openings, substantially as and for the purposes set forth.

9. The inclined picking-tables having openings surrounded by flanges that serve to deflect the nuts to either side, substantially as set forth.

10. The hinged picking-tables provided with ribs and outlets, in combination with the inclined bottom of a peanut-cleaning machine, substantially as described.

11. The combination of a fan-case having a series of parallel inclined blast-chutes directed upwardly, a hopper located over the same, and one or more partitions arranged in a case and provided with adjustable gates, substantially as described.

In testimony that I claim the foregoing as my own I affix my signature in presence of two witnesses.

JOSEE JOHNSON.

Witnesses:
F. O. McCLEARY,
W. R. KEYWORTH.